Sept. 11, 1951  M. W. BIRD  2,567,178
TRUCK FOR LOADING AND CONVEYING BUILDING MATERIALS
Filed Nov. 30, 1948  4 Sheets-Sheet 1
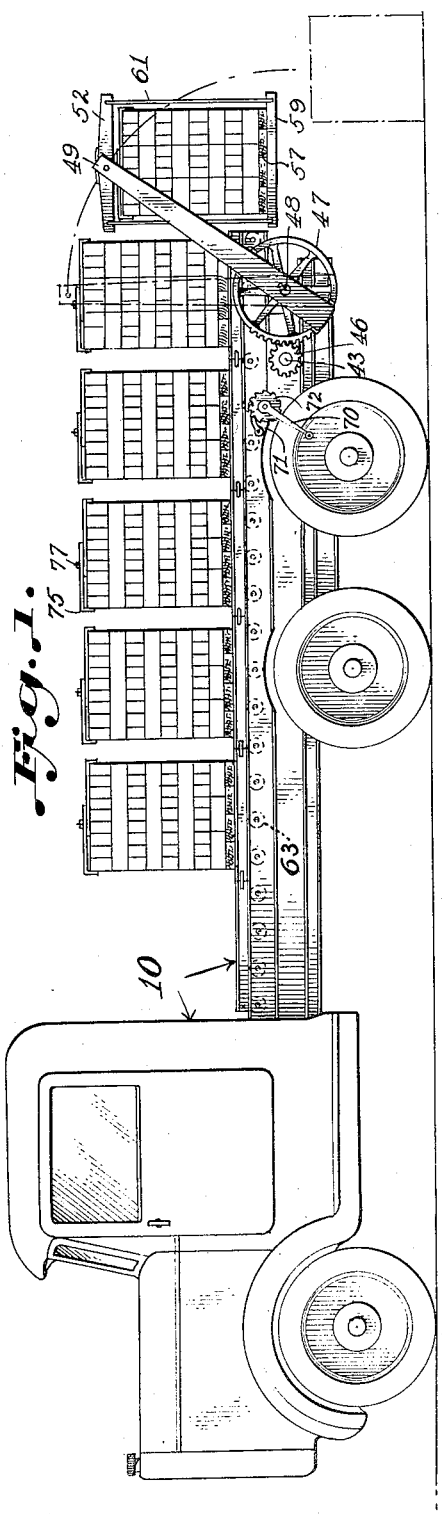
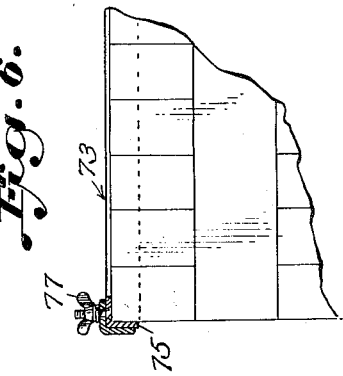
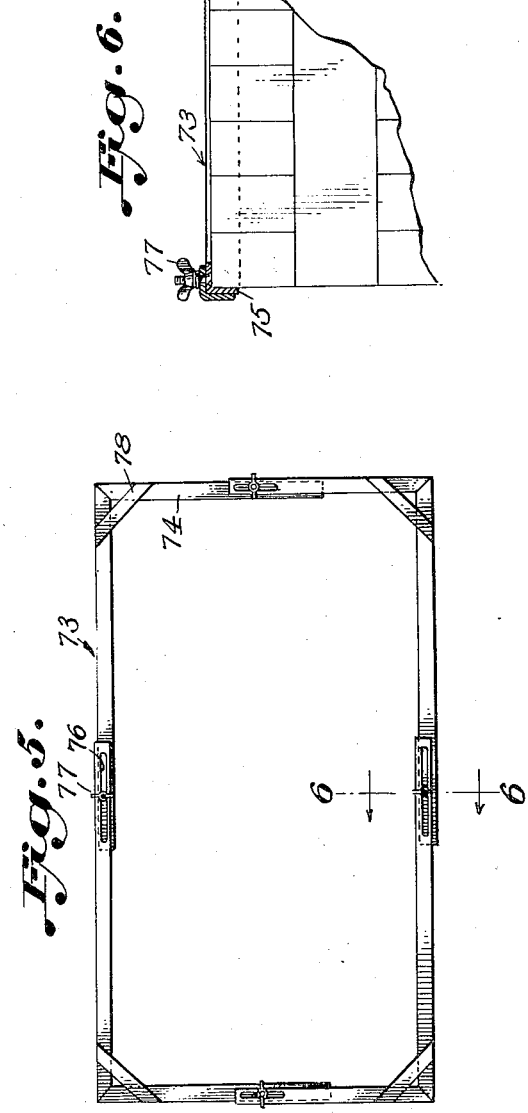
Inventor
Milton W. Bird
ATTORNEYS Sept. 11, 1951  M. W. BIRD  2,567,178
TRUCK FOR LOADING AND CONVEYING BUILDING MATERIALS
Filed Nov. 30, 1948  4 Sheets-Sheet 2
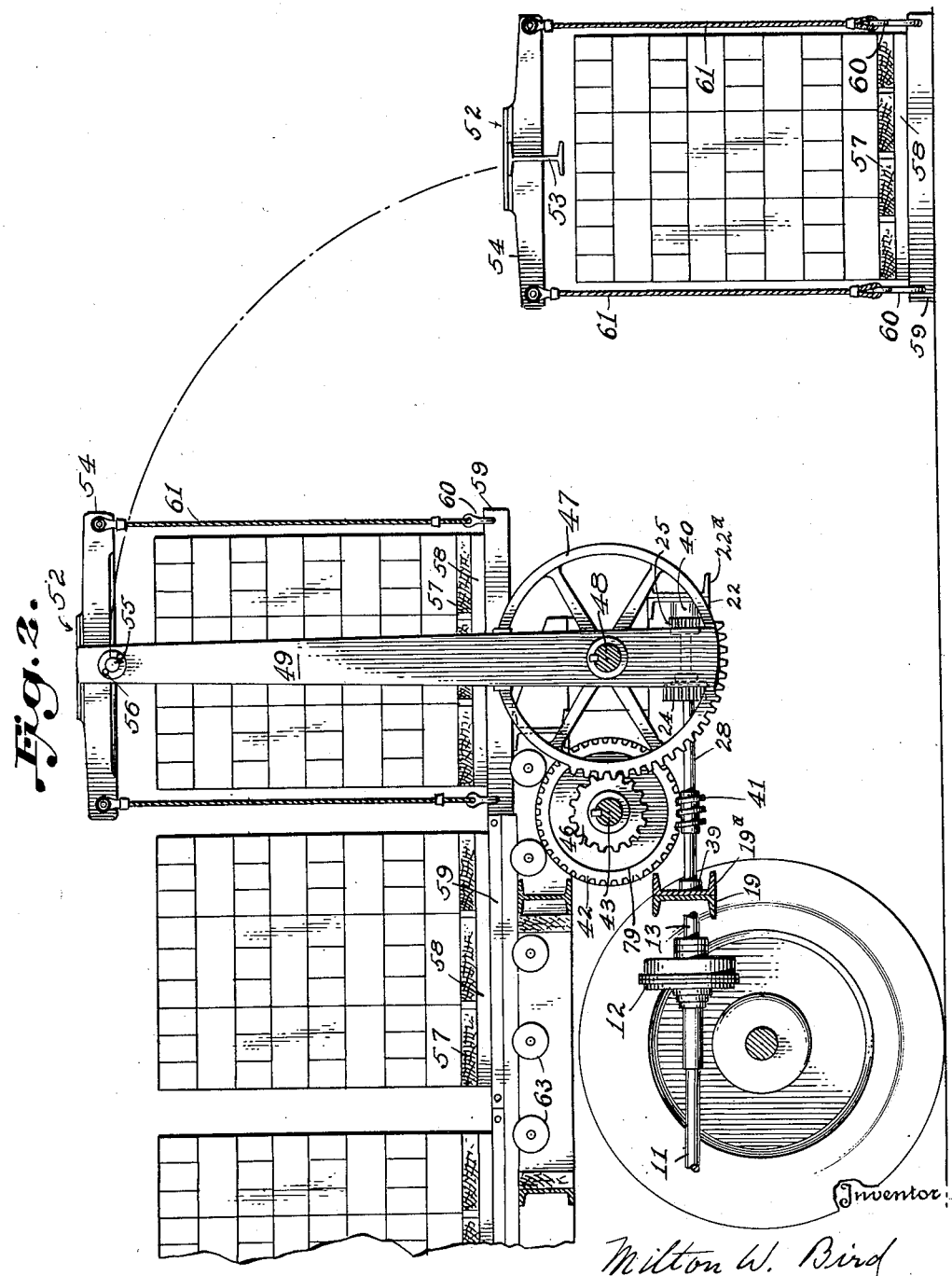

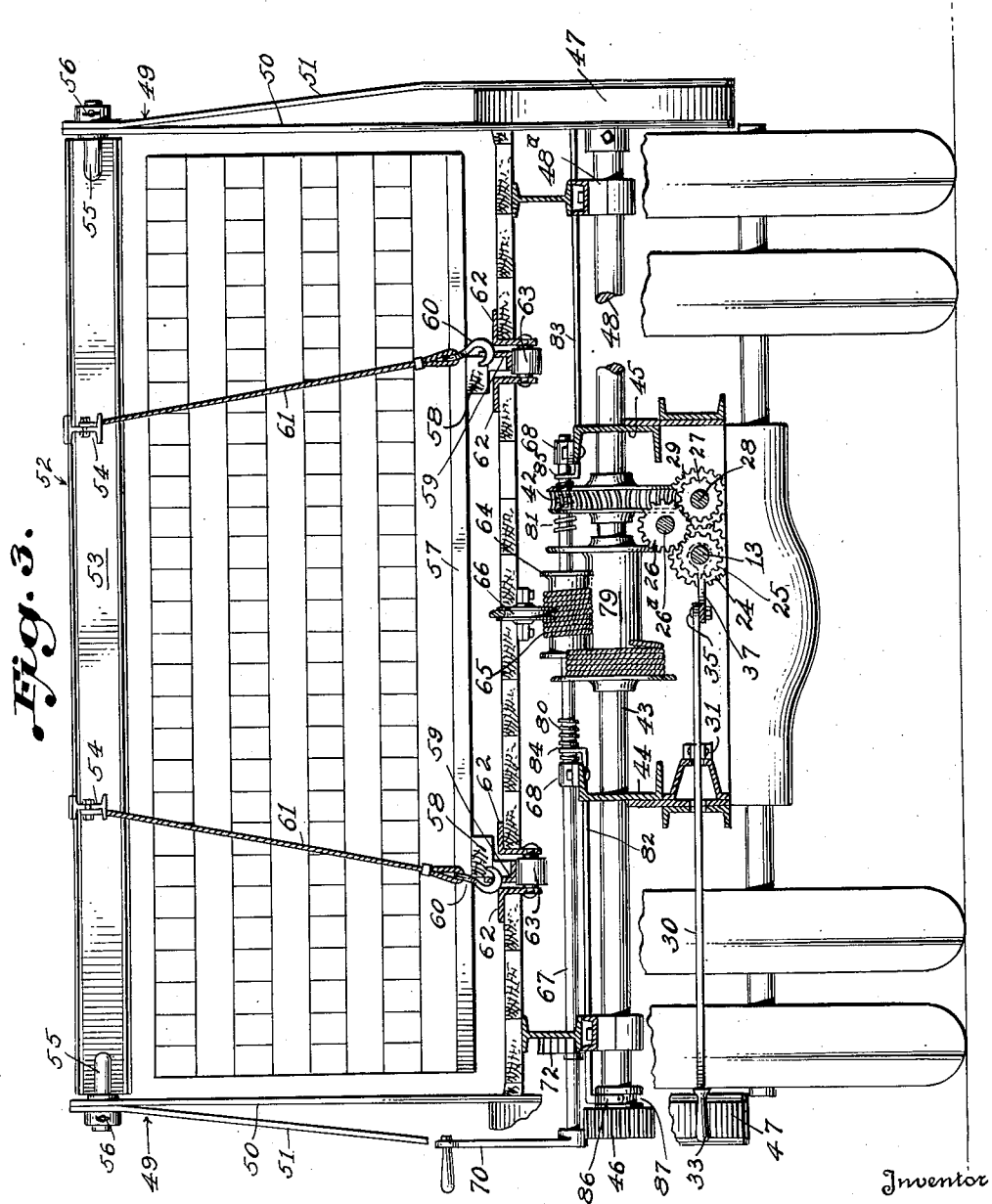

Sept. 11, 1951  M. W. BIRD  2,567,178
TRUCK FOR LOADING AND CONVEYING BUILDING MATERIALS
Filed Nov. 30, 1948  4 Sheets-Sheet 4
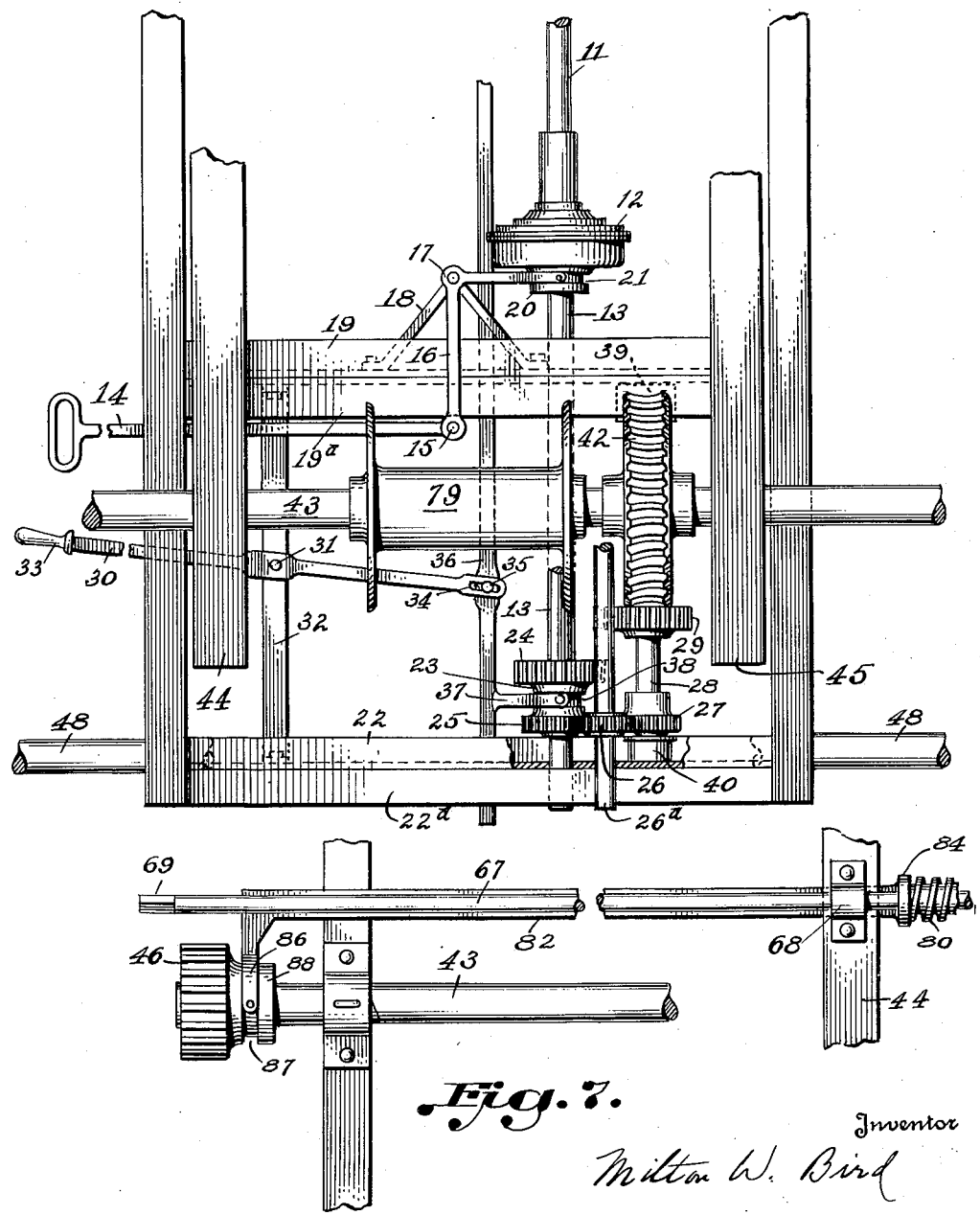

Patented Sept. 11, 1951

2,567,178

UNITED STATES PATENT OFFICE 2,567,178

TRUCK FOR LOADING AND CONVEYING BUILDING MATERIALS

Milton William Bird, Wenatchee, Wash.

Application November 30, 1948, Serial No. 62,705

5 Claims. (Cl. 214—77)

1

This invention relates to improvements in truck loading devices and has for its object the provision of an apparatus for quickly and efficiently loading and unloading material such as brick, tile and blocks to and from vehicles.

In the building industry, at the present time, the loading and unloading of materials such as bricks and the like is done by hand. This process requiring considerable time is expensive from this standpoint because of the number of men required for the job. At the same time, due to the rapidity and careless manner in which these laborers often load and unload materials, the bricks or other materials are frequently damaged by breakage or chipping thus rendering them incapable of being used.

Furthermore, on occasions when the point of delivery is too distant to justify the sending of additional help, the unloading by the truck driver is a long process and as a result valuable equipment is kept idle while such unloading is being done.

With these disadvantages in mind, it is accordingly a further object of my present invention to provide a power operated truck attachment with which a single operator can load, deliver and unload a shipment of materials in a short time, the delivered materials being placed at the building site, in a location most convenient to the workmen, undamaged and in perfect condition.

Another object of my invention is the provision of a truck attachment which will pick up pallets which have been loaded directly from the kiln and deliver the same intact at close hand for the builder.

Still other objects and advantages will become apparent from the following description of the present invention illustrated in the accompanying drawings in which:

Figure 1 shows a truck of the dray type equipped with a loading attachment constructed in accordance with my present invention.

Figure 2 is a fragmentary side view of the loading device showing various operating elements in detail.

Figure 3 is a rear elevation illustrating the mechanism employed to control the loader.

Figure 4 is a plan view showing the drive mechanism in detail.

Figure 5 is a plan view of an angle clamp to be used as a stabilizer in conjunction with the loads on the pallets.

Figure 6 is a sectional view taken on line 6—6 of Fig. 5.

Figure 7 is an enlarged plan view of one end

2 of the power drum shifting arms incorporated in my invention.

Similar reference characters in the several figures indicate similar parts.

The material handling device constituting my present invention may be readily mounted upon any vehicle having a conventional draying type chassis construction. Figure 1 shows a motor truck 10 such as commonly used in the building industry and having mounted at the rear of its platform a loading and unloading device in accordance with my invention.

The power to operate the loading attachment is taken from the truck drive shaft 11 which is engaged with the attachment mechanism at the will of the equipment operator through a conventional friction clutch 12 provided between the drive shaft and a driven gear shaft 13, as shown in Fig. 4 of the drawings. The engagement of the clutch is controlled from the operator's position near the rear of the truck by manipulation of a clutch lever 14 pivotally connected at 15 to a bell crank 16. The latter is journaled at 17 to a supporting bracket 18 bolted to a pair of channel beams 19—19$^a$ which form a transverse member of the chassis frame. The other end 20 of the bell crank forms a yoke which engages an annular recess 21 in the clutch assembly to provide a means for controlling the relative movement of the clutch plates for their engagement and disengagement. Thus when the lever 14 is pressed inwardly by the operator the clutch is engaged for operation of the loading device, the reverse function being accomplished when the lever is pulled outwardly.

The forward end of the driven shaft 13 passes through the vertical webs of channel beams 19—19$^a$ and its rear end is journaled in a bearing located in the webs of the transverse horizontal channel beams 22—22$^a$ located below the rear end of the truck chassis.

A gear block 23 carrying a pair of spur gears 24 and 25 is movable longitudinally on the driven shaft 13 and is keyed thereto by means of a spline formed on the rod. As shown in Fig. 4 the smaller spur gear 25 engages with an idler gear 26 on shaft 26$^a$ which is supported on the chassis. Idler gear 26 meshes with a second spur gear 27 and serves to revolve the latter in the same direction in which the driving gear 25 moves and thus rotates the worm shaft 28 to which gear 27 is fixed.

In order to reverse the motion of shaft 28, for reasons as will be later seen, the gear block 23 may be moved forward on the shaft 13 to a position wherein the gear 25 disengages with the idler gear and the large gear 24 engages with a second driven spur gear 29.

This reciprocating movement of the gear block 23 is effected by means of a reversing lever 30 pivotally supported at 31 on a cross brace 32. The outer end of this lever carries a handle 33 and on the inner end is formed an elongated eye 34. The eye embraces the shank of a vertical pin 35 on the longitudinal movable bar 36. Formed on bar 33 is a perpendicular yoke 37 the fingers of which engage a peripheral slot 38 in the gear block 23. Thus it will be seen that with the rearward movement of the operating handle 33 the gear block is thrust forward to disengage gears 25 and 26 and at the same time engage gears 24 and 27 to reverse the direction of rotation of the driven worm shaft 28.

The last mentioned shaft is journaled at its ends within the thrust bearings 39 and 40 (Fig. 2) mounted on the webs of the channel beams 19a and 22 respectively. A worm gear 41 is secured to shaft 28 and is in driving engagement with the teeth of a worm wheel 42 fixed on shaft 43. This shaft extends transversely of the chassis and is supported by the longitudinal channel beams thereof, indicated at 44 and 45. Keyed to each of the outer ends of shaft 43 at points beyond the sides of the chassis are terminal pinions 46 by means of which the pallet handling arms are oscillated.

In the operative position of the pinions 46 their teeth engage those on the periphery of the sector gear wheels 47 keyed to the outer ends of a transverse oscillatory shaft 48 journaled in bearings 48a (Fig. 3) at the extreme rear of the chassis. Also keyed to the ends of shaft 48 and preferably also attached to each of the gear wheels 47 is a lifting arm 49 comprising inner and outer members 50 and 51. The inner member 50 is straight and extends outwardly parallel to the wheel 47 while member 51 located at the outer face of the wheel has an offset bend (Fig. 3) permitting its extremity to be united to that of member 50. In this manner the arms are strengthened and their swaying laterally when under heavy loads is prevented.

Between the free ends of the lifting arms 49 is a hoisting frame 52 composed of a transverse I beam 53 and spaced longitudinal I beams 54 extending transversely thereof. The hoist frame is attached to the lifting arms by means of the pivot pins 55 projecting from the ends of the transverse beams 54 and passing through alined openings in the ends of the arms to which they are locked by any suitable device such as the cotter pins 56, shown in Fig. 2.

The individual stacks of brick or tile to be loaded on the truck may be assembled directly on pallets as these articles are removed from the kiln. These pallets are primarily wooden platforms 57 on the lower side of which is a pair of L-shaped sleepers 58 arranged to extend longitudinally of the truck platform and reinforced by angle irons 59 forming runners which extend beyond the ends of sleepers 58 and are provided with apertures to receive hooks 60 on cable slings 61 suspended from the I-beams 54 of the hoisting frame. Thus it will be seen that the pallet of bricks may be connected to the hoist frame and lifted to the bed of the truck upon activation of the driving mechanism under the control of the vehicle operator.

When a pallet is placed on the bed of the truck, the runners are received by two longitudinal recesses which extend the entire length of the platform of the vehicle. These recesses are each lined by a pair of angle irons 62 the vertical flanges of which support a series of antifriction rollers 63 and provide a runway permitting the loaded pallets of material to be pushed forward on the truck bed by successive on-coming pallets.

To facilitate the unloading of the pallets at the point of destination, I have provided a means for manually drawing each successively to the rear of the truck bed when its predecessor has been lowered to the ground. This means consists of a small cylindrical drum 64 about which is wound a length of rope or cable 65 the free end of which is provided with a hook (not shown) for attachment to the pallet to be moved. A single pulley 66 centrally located at the rear edge of the truck platform provides a directional guide for the rope or cable and prevents undue wear of the same. The drum 64 is keyed to a transverse shaft 67 extending across the upper flanges of chassis beams 44 and 45 on which it is secured by journal boxes 68. The outer end of shaft 67 is squared, as shown at 69 (Fig. 7) to receive an operating crank arm 70 for manual operation.

In order to prevent the pallet which is being handled from rolling forward again when the crank 70 is released, a holding pawl 71 fastened to the side of the chassis cooperates with the teeth of a ratchet wheel 72 on the shaft 67 to hold the latter from counter rotation.

An angle clamp 73, such as shown in Figs. 5 and 6 may embrace the uppermost tier in each pile of material to prevent displacement of the individual bricks or pieces during transportation from one site to another. The clamp is of rectangular configuration and consists of telescoping corner sections 74. Each leg of a corner section is of angle iron stock as shown at 75 and is welded at one end to an adjacent leg of the corner section. The free ends of the corner legs 74 contain elongated slots 76 through which a bolt passes to unite adjacent corner sections. The frame may thus be adjusted to the perimeter of the tier of goods and the corner sections relatively secured by tightening the wing nuts 77 threaded on the connecting bolts. Rigidity is added to the frame structure by diagonal braces 78 connecting the legs of each corner section.

As a further feature of my invention, in addition to the loading mechanism, I have provided a winch which is often useful in handling heavy loads, or positioning the truck at either a receiving or delivering point, particularly the latter because of the uneven terrain frequently surrounding a building site. For the sake of compactness and in order also to reduce the number of parts I make use, in carrying out this feature, of the shaft 43 and provide means for disconnecting it from the gears 49 which operate the hoisting arms, whereby I am able to rotate it continuously in either direction by the worm or worm gear 42. The winch 79 is of the conventional drum type carrying a length of draft cable $79^2$. It is keyed to the transverse shaft 43 of the driving mechanism.

I accomplish the foregoing by means of a gear shift which may be actuated by rotation of the operating crank 70 for disengaging pinions 46 from the sector gear wheels 47 when it is desired to rotate the winch alone. Inasmuch as shaft 67 carries the spool 64 and in operating it it is immaterial if the spool is revolved by its shaft when the latter is rotated to move the gears 46 to an inoperative position, I have provided the following arrangement of parts. On shaft 67 there are two sets of screw threads 80—81 which when the shaft is rotated in opposite directions effect the reciprocation of a pair of transverse shift arms 82 and 83 to which they are respectively connected through threaded offset ends 84 and 85 formed on the inner ends of the arms. At the outer end of each shift arm is formed a perpendicular yoke 86 which fits within an annular groove 87 in the periphery of their hubs 88.

Each pinion 46 is loosely keyed to its respective end of shaft 43 so as to afford a sliding fit so that by rotation of the crank 70 in one direction the screws will draw the arms 82 and 83 inwardly simultaneously into their inoperative position. In the position of the pinions, rotation of shaft 43 is ineffective to actuate the lifting arms and the operator may independently use the power winch 79 as desired. Counter rotation of the crank 70 will accordingly cause the members 82 and 83 to travel outwardly and restore the pinions 46 to their normal position in mesh with their respective gear wheels 47.

In the operation of my loading device, with the truck drive shaft 11 in motion the operator presses the lever 14 inwardly to engage the friction clutch 12. This transmission of power rotates the shaft 13 whereupon by movement of the reversing lever 30 either gear 24 or pinion 25 may be caused to mesh respectively with gear 29 or pinion 26 to drive the worm gear on the driven shaft 28 to rotate the worm wheel 42 and shaft 43. Rotation of pinions 46 in one direction drive the sector gear wheels 47 to raise the lifting arms to deposit a laden pallet in position on the bed of the truck in readiness to be pushed forwardly thereon. Succeeding pallets being pushed into riding position cause those previously loaded to be pushed forward.

To unload the building material from the truck each pallet is successively drawn to the rear by means of the crank operated drum cable 65 when it is attached to the hoist frame by which it can be lowered to the ground. The lowering of the arms 49 is accomplished by manipulation of the lever 30 to reverse the motion of the gear transmission mechanism.

From the foregoing description of my invention it will be seen that I have provided a loading device with which a supply of four or five thousand bricks can be loaded and unloaded by a single worker in a very short time and will be left neatly piled at the job site. Mechanically the loader is designed in an inexpensive and simple manner and can be readily attached to almost any of the draying trucks now used in the building industry.

Primarily my device offers unprecedented economy in the utilization of time, labor and equipment involved in the delivery of building materials.

While a preferred form of the invention has been shown and described it will be understood that variation in details of form may be made without departure from the invention as defined in the appended claims.

I claim:

1. In a truck loading and unloading device for handling building materials stacked on pallets, the combination with a vehicle having a drive shaft, of a power transmission gear assembly associated with said shaft and containing a revoluble transverse shaft having terminal pinions keyed thereto, cantilever lifting arms actuated by said pinions, a hoist frame carried by the free ends of said arms, means for connecting said frame with a pallet, a winch carried by said transverse shaft, and crank operated shift arms connected to said pinions to slide the same from driving engagement with the lifting arms to permit independent operation of said winch.

2. In a truck loading and unloading device for handling building materials stacked on pallets, the combination with a vehicle having a drive shaft, of a power transmission gear assembly associated with said shaft and containing a revoluble transverse work shaft having terminal pinions keyed thereto to prevent relative rotation between the work shaft and pinions, said pinions being longitudinally slidable with respect to the work shaft, a second transverse shaft, sector gear wheels on the ends of said second shaft and normally engaging said pinions, lifting arms carried by said wheels, a hoist frame carried at the free ends of said arms, means for connecting said frame with a pallet, and means for shifting said pinions axially on said work shaft to disengage the pinions from the sector gear wheels to permit operation of said work shaft without movement of the lifting arms.

3. In a truck loading and unloading device for handling building materials stacked on pallets, the combination with a vehicle having a drive shaft, of a power transmission gear assembly associated with said shaft and containing a revoluble transverse work shaft having terminal pinions keyed thereto to prevent relative rotation between the work shaft and pinions, said pinions being longitudinally slidable with respect to the work shaft, a second transverse shaft, sector gear wheels on the ends of said second shaft and normally engaging said pinions, lifting arms carried by said wheels, a hoist frame carried at the free ends of said arms, means for connecting said frame with a pallet, a crank operated rod extending transverse of the vehicle, said rod having threaded sections thereon, shifter arms each having one end engaging the threaded rod and another end coupled to one of said pinions whereby rotation of said rod will reciprocate said shifter arms and pinions to disengage the pinions from said sector gear wheels and permit independent operation of the work shaft.

4. In a truck loading and unloading device for handling building materials stacked on pallets, the combination with a vehicle having a drive shaft, of a power transmission gear assembly associated with said shaft and containing a revoluble transverse work shaft having terminal pinions keyed thereto to prevent relative rotation between the work shaft and pinions, and pinions being longitudinally slidable with respect to the work shaft, a second transverse shaft, sector gear wheels on the ends of said second shaft and normally engaging said pinions, lifting arms carried by said wheels, a hoist frame carried at the free ends of said arms, means for connecting said frame with a pallet, means for shifting said pinions axially on said work shaft to disengage the pinions from the sector gear wheels to permit operation of said work shaft without movement of the lifting arms, and antifriction runways on the bed of the vehicle to assist in the movement of said pallets to and from the rear of the bed.

5. In a truck loading and unloading device for handling building materials stacked on pallets, the combination with a vehicle having a drive shaft, of a power transmission gear assembly associated with said shaft and containing a revoluble transverse work shaft having terminal pinions keyed thereto to prevent relative rotation between the work shaft and pinions, said pinions being longitudinally slidable with respect to the work shaft, a second transverse shaft, sector gear wheels on the ends of said second shaft and normally engaging said pinions, lifting arms carried by said wheels, a hoist frame carried at the free ends of said arms, means for connecting said frame with a pallet, means for shifting said pinions axially on said work shaft to disengage the pinions from the sector gear wheels to permit operation of said work shaft without movement of the lifting arms, antifriction runways on the bed of the vehicle to assist in the movement of said pallets to and from the rear of the bed, and manually operable means for drawing pallets to the rear of the vehicle.

MILTON WILLIAM BIRD.

REFERENCES CITED

The following references are of record in the file of this patent:

UNITED STATES PATENTS

| Number | Name | Date |
| --- | --- | --- |
| 1,052,096 | Schulze | Feb. 4, 1913 |
| 1,408,576 | Frantz | Mar. 7, 1922 |
| 2,045,566 | Berg | June 30, 1936 |
| 2,099,998 | Berg | Nov. 23, 1937 |
| 2,442,549 | Pearlman | June 1, 1948 |
| 2,459,045 | Pride | Jan. 11, 1949 |
| 2,478,513 | Desco | Aug. 9, 1949 |